United States Patent [19]
Rump et al.

[11] Patent Number: 5,669,676
[45] Date of Patent: Sep. 23, 1997

[54] METHOD FOR DETERMINING THE START OF AN AUTOMATIC BRAKING PROCESS

[75] Inventors: Siegfried Rump, Weinstadt; Alexander Fuchs, Stuttgart; Bernd Knoff, Esslingen, all of Germany

[73] Assignee: Mercedes-Benz AG, Germany

[21] Appl. No.: 550,733

[22] Filed: Oct. 31, 1995

[30] Foreign Application Priority Data

Oct. 31, 1994 [DE] Germany .................. 44 38 966.3

[51] Int. Cl.⁶ ................................................ B60T 13/68
[52] U.S. Cl. ............... 303/125; 303/113.4; 364/426.01
[58] Field of Search ......................... 303/155, 125, 303/113.4, 115.2, 3, 10, 15, 20; 364/426.01, 426.02

[56] References Cited

U.S. PATENT DOCUMENTS

| | | | |
|---|---|---|---|
| 5,427,442 | 6/1995 | Heibel | 303/113.4 X |
| 5,445,444 | 8/1995 | Rump et al. | 303/113.2 X |
| 5,535,123 | 7/1996 | Rump et al. | 303/155 |

FOREIGN PATENT DOCUMENTS

| | | |
|---|---|---|
| 40 28 290 | 1/1992 | Germany . |
| 4102497 | 5/1992 | Germany . |
| 4208496 | 8/1993 | Germany . |
| 43 25 940 | 12/1994 | Germany . |
| 4-293654 | 10/1992 | Japan . |
| 4-334649 | 11/1992 | Japan . |
| 5-85335 | 4/1993 | Japan . |
| 5-262219 | 10/1993 | Japan . |
| 6-179361 | 6/1994 | Japan . |

*Primary Examiner*—Lee W. Young
*Attorney, Agent, or Firm*—Evenson, McKeown, Edwards & Lenahan P.L.L.C.

[57] ABSTRACT

The invention relates to a method for determining the start of an automatic braking process. In those instances where the brake pedal is actuated starting from an initially unactuated position, triggering of automatic braking occurs when the actuation speed of the brake pedal remains above a threshold trigger value for automatic braking, and a prescribed pedal travel is exceeded in a specific time interval after the start of the actuation of the brake pedal. Light depression of the brake pedal which takes place only briefly at a high pedal actuation speed does not lead to the automatic braking process being triggered.

10 Claims, 1 Drawing Sheet

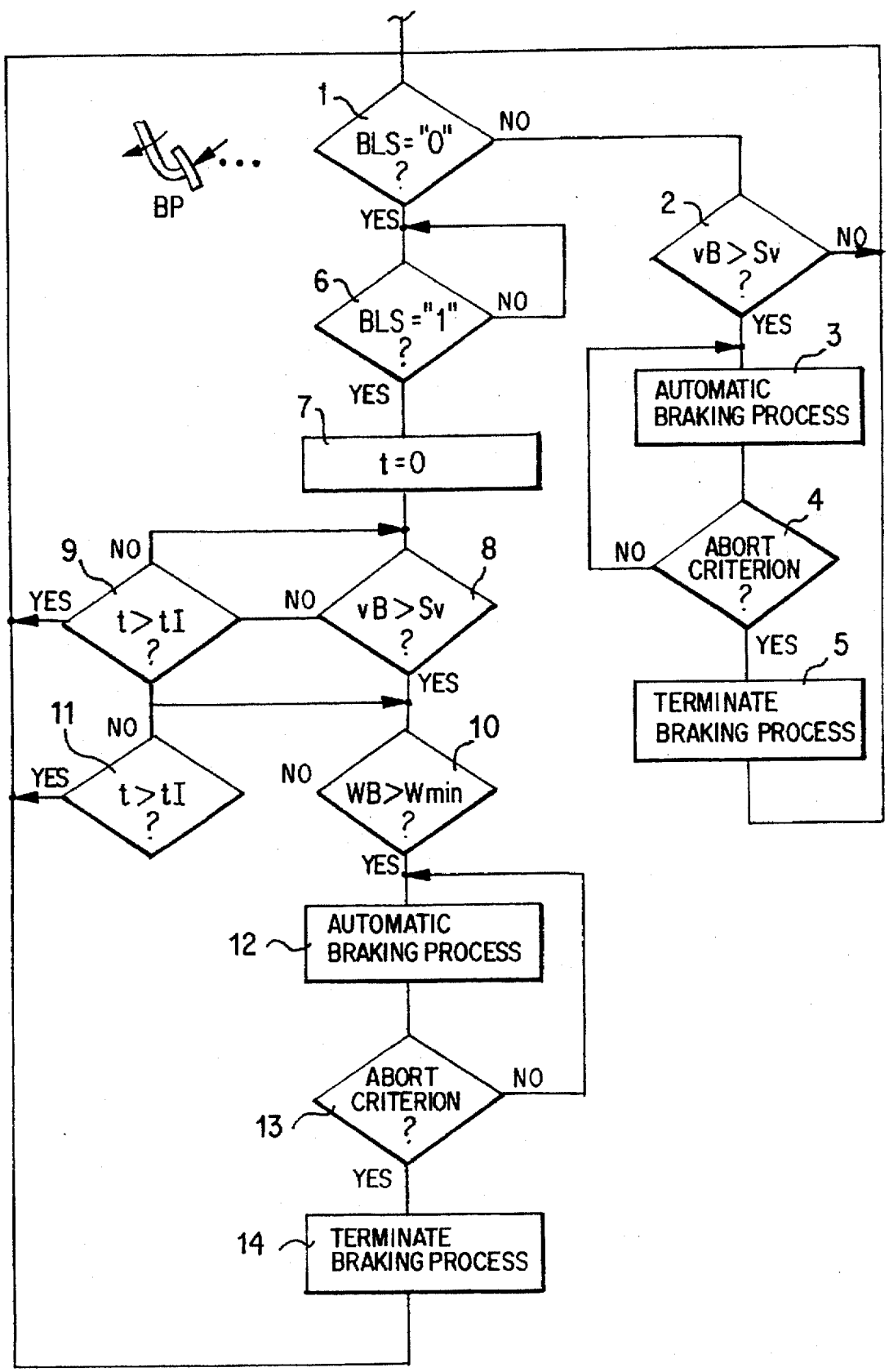

METHOD FOR DETERMINING THE START OF AN AUTOMATIC BRAKING PROCESS

BACKGROUND AND SUMMARY OF THE INVENTION

The invention relates to a method for determining the start of an automatic braking process.

German Patent Document DE 40 28 290 C1 discloses an automatic braking process which is carried out when the actuation speed of the brake pedal exceeds a threshold value. During the automatic braking process a higher braking pressure is produced than corresponds to the position of the brake pedal.

Furthermore, non-prepublished German Patent Document DE 43 25 940.5-21 discloses a method of the generic type for determining the start of such an automatic braking process, in which the threshold value for triggering the automatic braking process is determined as a function of the extent of brake pedal travel. That is, allowance is made for the fact that as the pedal travel increases its actuation speed naturally decreases, since the braking pressure which is built up counteracts the actuation by the driver. The automatic braking process is triggered only if over a specific pedal travel, the actuation speed remains above the threshold value for the triggering of the automatic braking process.

In automatic braking processes which are triggered as a function of the actuation speed of the brake pedal, the problem arises that many drivers tend to depress the brake pedal lightly at a high actuation speed, without however desiring a large braking effect. This behavior (sometimes referred to as "tapping" the brakes) occurs principally in the case of brake pedal actuations starting from the unactuated position of the brake pedal. Since, in these cases, the driver does not desire or expect a large degree of deceleration of the vehicle, he is surprised by the vehicle deceleration caused by the automatic braking process which is initiated. Dangerous traffic situations may arise if a large deceleration of the vehicle is initiated in a surprising fashion and the driver reacts incorrectly.

The object of the present invention is to reliably prevent incorrect triggering of automatic braking in the case of actuation of the brakes starting from the unactuated position of the brake pedal.

This object is achieved by the method according to the invention in which, when the brake pedal is initially actuated (that is, from an unactuated position), dual criteria are used for triggering automatic braking dependent on both the actuation speed of the brake pedal and the extent of pedal travel during a specific time interval after the start of the actuation of the brake pedal (that is, whether a prescribed threshold value for the pedal travel is exceeded). Since this time interval can be selected to be relatively short, this criterion makes it possible to decide reliably, and without a long time delay, whether or not an automatic braking process is to be triggered. Light depression of the brake pedal which occurs only briefly at a high pedal actuation speed is detected, but does not lead to triggering of the automatic braking process since the threshold value for the pedal travel is not exceeded. Since the interrogation period is temporally limited, a time period which is well defined in the temporal sequence of the method, namely the time interval, is required to evaluate whether the automatic braking process is to be carried out in order to determine the triggering of the automatic braking process. This process results in rapid initiation of the automatic braking process when the same is required, and a rapid increase of the resulting braking pressure which is increased in comparison with the braking pressure corresponding to the position of the brake pedal.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a flow chart which illustrates the process according to the invention.

DETAILED DESCRIPTION OF THE DRAWING

Referring to the FIGURE, in step 1 it is determined whether the brake pedal BP (shown schematically) is at an at least virtually unactuated position. This is determined according to one embodiment of the present invention in that the signal of the brake light switch BLS, which represents the actuation of the brake pedal, has a state which represents an unactuated brake pedal. In this state the circuit of the brake light is interrupted. Consequently, the signal which corresponds to this state of the brake light switch is designated as "0". When the brake pedal is actuated, the circuit of the brake light is closed and the signal which corresponds to this state of the brake light switch BLS is designated by "1".

If it is determined in step 1 that the brake pedal is already actuated, the process advances to step 2 where it is checked whether the actuation speed vB of the brake pedal fulfills the triggering criterion prescribed as a function of the actuation speed vB of the brake pedal BP. That is, the sole triggering criterion in this case is whether the actuation speed vB exceeds a prescribed threshold value Sv, which may be predetermined or may vary as a function of different variables (for example driver-dependent variables, the speed of the vehicle or the pedal travel which has already occurred). If the threshold value Sv is not exceeded, the system returns to step 1. If, however, the threshold value Sv has been exceeded, in step 3 the automatic braking process is carried out until it is determined in step 4 that the abort criterion of the automatic braking process is fulfilled.

During the automatic braking process a braking pressure is produced which is greater than the braking pressure which corresponds to the position of the brake pedal; the braking pressure which is produced is however limited on the one hand by the maximum brake pressure which can be produced and on the other hand by the locking limit being reached by the wheels of the vehicle. An example of an abort criterion is when a negative pedal actuation speed is reached; that is to say the brake pedal is actuated toward its unactuated rest position. If the abort criterion is fulfilled, automatic braking is terminated. For this purpose, the additional braking pressure (relative to the braking pressure which corresponds to the position of the brake pedal) must be reduced. Thereafter, the system returns to step 1.

If it was determined in step 1 that the brake pedal BP is in an at least virtually unactuated position (as defined above), in step 6 it is determined whether the brake pedal is actuated (that is, whether the signal of the brake light switch BLS has changed to "1"). Step 6 is repeated until the brake pedal is actuated. Thereafter, the time counter t is reset to the value '0' in step 7, and it is determined in step 8 whether the triggering criterion based on the actuation speed vB of the brake pedal is satisfied. (See step 2.) If not, in step 9 it is determined whether the time interval tI has expired since step 7. If so, the system returns to step 1 and the process is repeated, while if tI has not yet expired, step 8 is repeated.

If it is determined in step 8 (prior to expiration of the time period tI) that the triggering criterion based on the actuation speed vB of the brake pedal is satisfied, a check is made in step 10 whether the pedal travel WB is greater than a lower threshold value Wmin. If not, processing advances to step 11, and if the time interval tI has expired since step 7, the system returns to step 1. If not, however, step 8 is repeated.

If it is determined in step 8 that the pedal travel WB is greater than a threshold value Wmin, the automatic braking process is carried out in step 11 until it has been determined in step 12 that an abort criterion is fulfilled. When the abort criterion is fulfilled, in step 13 the braking pressure (which has been increased to a level greater than that which corresponds to the position of the brake pedal) is reduced. Thereafter, the system returns to step 1. In this process, the steps 12 to 14 correspond to steps 3 to 5, since the same automatic braking process is carried out in both cases. The triggering criterion interrogated in step 8 also corresponds to the triggering criterion interrogated in step 2, but the threshold values of the actuation speed may differ from one another in their value.

The duration of the time interval tI is preferably between 70 and 240 ms. The threshold value Wmin for the pedal travel WB is preferably between 20 and 40 mm. Pedal travel can be measured starting from the pedal position at the time when BLS changes from the "0" position to the "1" position. This position is usually prescribed precisely and drifting of the pedal travel sensor can be compensated by resetting the travel measurement. It is to be noted here that both the duration of the time interval tI and the threshold value Wmin for the pedal travel are essentially dependent on the conditions in the vehicle, and therefore have to be matched carefully to these conditions.

Since it is necessary to detect the pedal travel in order to realize the invention, instead of the signal of the brake light switch BLS, a pedal travel-dependent signal which represents the distinction between the unactuated brake pedal and the actuated brake pedal can also be generated. Thus, the pedal travel can be measured starting from the position of rest. When the pedal travel is less than a specific initial threshold value (for example 5 mm), this is evaluated as an at least virtually unactuated brake pedal and a corresponding state of the signal is produced. An actuated brake pedal is accordingly detected if the pedal travel measured starting from the position of rest of the brake pedal is greater than the initial threshold value.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In an automatic braking system of the type wherein during automatic braking, braking pressure is applied which is greater than that which corresponds to a position of a brake pedal of said system, a method for determining the start of automatic braking comprising the steps of:

detecting the position of said brake pedal relative to an unactuated rest position thereof;

detecting an actuation of said brake pedal;

detecting an actuation speed and a pedal travel of said brake pedal; and when said actuation of said brake pedal commences from an at least substantially unactuated position of said brake pedal, triggering said automatic braking when both of the following are satisfied;

actuation speed of said brake pedal in a direction which increases braking pressure satisfies a triggering criterion; and pedal travel of said brake pedal during a prescribed time interval after the start of said actuation of the brake pedal exceeds a prescribed threshold value.

2. Method according to claim 1 wherein said step of detecting an actuation of said brake pedal comprises detecting actuation of the brake pedal from said at least substantially unactuated position when a signal which represents actuation of the brake pedal changes from a first state which corresponds to an unactuated position of the brake pedal to a second state which corresponds to an actuated position of the brake pedal.

3. Method according to claim 2 wherein the signal which represents actuation of the brake is generated in response to a switched position of a brake light switch.

4. Method according to claim 2 wherein the prescribed time interval is measured starting from the time when the signal which represents the actuation of the brake pedal changes from said first state into said second state.

5. Method according to claim 1 wherein the time interval is between 70 and 240 ms.

6. Method according to claim 2 wherein pedal travel is measured from a position of the brake pedal when the transition of the signal which represents the actuation of the brake pedal changes from said first state into said second state.

7. Method according to claim 1 wherein the threshold value for the pedal travel is between 20 and 40 mm.

8. Method according to claim 1 wherein pedal travel is measured starting from the rest position; and said at least substantially unactuated position of said brake pedal comprises a position wherein said pedal travel does not exceed an initial threshold value.

9. Method according to claim 8 wherein the time interval is measured from a time at which the pedal travel exceeds the initial threshold value.

10. Method according to claim 8 wherein the threshold value for the pedal travel is measured from a point at which the initial threshold value is exceeded.

* * * * *